United States Patent
Pagan

(10) Patent No.: US 8,244,879 B2
(45) Date of Patent: Aug. 14, 2012

(54) SURREPTITIOUS WEB SERVER BIAS TOWARDS DESIRED BROWSERS

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/943,426

(22) Filed: Nov. 20, 2007

(65) Prior Publication Data
US 2009/0129378 A1    May 21, 2009

(51) Int. Cl.
*G06F 15/16* (2006.01)
*H04L 29/06* (2006.01)

(52) U.S. Cl. ........ 709/227; 709/228; 709/229; 713/150; 713/151

(58) Field of Classification Search .............. 713/150, 713/151; 709/200, 201, 227, 228, 229
See application file for complete search history.

(56) References Cited

U.S. PATENT DOCUMENTS

| | | | |
|---|---|---|---|
| 6,332,163 B1* | 12/2001 | Bowman-Amuah | 709/231 |
| 6,496,824 B1* | 12/2002 | Wilf | 707/688 |
| 6,640,249 B1* | 10/2003 | Bowman-Amuah | 709/228 |
| 6,918,066 B2 | 7/2005 | Dutta et al. | |
| 7,003,565 B2* | 2/2006 | Hind et al. | 709/224 |
| 7,117,504 B2* | 10/2006 | Smith et al. | 719/328 |
| 7,257,636 B2* | 8/2007 | Lee et al. | 709/229 |
| 7,644,414 B2* | 1/2010 | Smith et al. | 719/328 |
| 2003/0159029 A1* | 8/2003 | Brown et al. | 713/151 |
| 2003/0197630 A1* | 10/2003 | Border et al. | 341/106 |
| 2004/0088212 A1* | 5/2004 | Hill | 705/10 |
| 2004/0093257 A1* | 5/2004 | Rogers et al. | 705/10 |
| 2004/0210771 A1* | 10/2004 | Wood et al. | 713/201 |
| 2004/0230825 A1* | 11/2004 | Shepherd et al. | 713/200 |
| 2004/0260921 A1* | 12/2004 | Treadwell | 713/150 |
| 2007/0011336 A1* | 1/2007 | Jarrad et al. | 709/227 |
| 2007/0016651 A1* | 1/2007 | Blagsvedt et al. | 709/217 |
| 2007/0136814 A1* | 6/2007 | Lee et al. | 726/25 |
| 2008/0015820 A1* | 1/2008 | Kolessar et al. | 702/189 |
| 2008/0201464 A1* | 8/2008 | Campbell et al. | 709/224 |
| 2008/0235142 A1* | 9/2008 | Gonze et al. | 705/59 |
| 2009/0325708 A9* | 12/2009 | Kerr | 463/42 |

OTHER PUBLICATIONS

Weinreich, Harald, et al; Off the Beaten Tracks: Exploring Three Aspects of Web Navigation; WWW 2006, Edinburgh, Scotland.
Cranor, Lorrie, et al; User Interfaces for Privacy Agents; ACM Transactions on Computer-Human Interaction, vol. 13, No. 2, Jun. 2006, pp. 135-178.

(Continued)

*Primary Examiner* — Hieu Hoang
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to processing requests from a client to a server and provide a novel and non-obvious method, system and computer program product for transmitting data in a surreptitious pattern. In this regard, in one embodiment of the invention, a method for processing requests from a client system to a server system through a communications network can be provided. The method can include establishing a covert packetization pattern for fragmenting data into packets before transmission, splitting a request into one or more packets according to the covert packetization pattern, transmitting each packet to a server system, responsive to reconstructing fragmented packets, recognizing the covert packetization pattern, and responsive to recognizing the covert packetization pattern, giving priority to a client system.

12 Claims, 2 Drawing Sheets

OTHER PUBLICATIONS

Whalen, Tara, et al; Gathering Evidence: Use of Visual Security Cues in Web Browsers; ACM Digital Library.

Drott, M. Carl, et al; Using Web Server Logs to Improve Site Design; ACM Digital Library 1998.

Soundararajan, Gokul, et al; Reactive Provisioning of Backend Databases in Shared Dynamic Content Server Clusters; ACM Transactions on Autonomous and Adaptive Systems, vol. 1, No. 2, Dec. 2006, pp. 151-188.

Etsion, Yoav, et al; Process Prioritization Using Output Production: Scheduling for Multimedia; ACM Transactions on Multimedia Computing, Communications and Applications, vol. 2, No. 4, Nov. 2004, pp. 318-342.

* cited by examiner

SURREPTITIOUS WEB SERVER BIAS TOWARDS DESIRED BROWSERS

BACKGROUND OF THE INVENTION

1. Field of the Invention

The present invention relates to the field of client server communications and more particularly to differentiated web browser request processing.

2. Description of the Related Art

The popularity of client/server applications and their common information and transport protocols, the hypertext markup language (HTML) and the hypertext transfer protocol (HTTP), has lead to rapid acceptance of web technology as a universal interface for network access to information. HTTP is a machine independent protocol and utilizes connectionless best-efforts to send information. In consequence, each HTTP transaction is fully self-contained. An example of a typical client or web browser initiating a request for a web site from the web server illustrates the basic relationship between HTTP, HTML, the transport control protocol (TCP)/Internet Protocol (IP) and the server/client.

In illustration, FIG. 1A schematically depicts a communication structure for a web browser and web server known in the art. The system can include a web browser 105 that communicates with a web server 110 over a data communications link 115. The communications link 115 can include a local area network connection, wide area network connection, a connection over telephone lines or a combination of connection methods. The web browser 105 can communicate with the web server 110 using the generic communication protocol HTTP which can be transmitted between the web browser 105 and web server 110 over a TCP/IP link 115. The web server 110 can operate by accepting HTTP requests 120 from the network, and providing an HTTP response 125 to the requesting web browser 105. The HTTP response 125 can typically consist of an HTML document, but can also be a raw text file, an image, or some other type of document.

When web browser end user requests information from a particular web site, the browser initiates communication with the server by sending a "get" request to the server specifying the Universal Resource Locator (URL) of the desired web site. The web server would then obtain and supply the web browser with the HTML data corresponding to the web site specified by the URL. The web browser would then evaluate the HTML data received as an HTTP data stream from the web server to see if there were any embedded hyperlinks such as an icon or an image and, if such hyperlink exists would initiate requests specifying the URL of the hyperlink to obtain the specified data. This data would be incorporated into the designated web site and displayed to the user. Thus, a single user input request by a web browser may result in multiple additional requests which are automatically carried out by the web browser in response to the receipt of the HTML data corresponding to the user input request.

It is well known that some have implemented web sites in such a way that the sites render in a superior fashion in one Internet browser better than in another. Consequently, the web site owner has a stake in one web browser appearing to perform better than another. The problem is that the reputation of the web designer can be damaged for building a site that is not cross-platform as-it will be obvious that the designer favors a particular web browser. What is needed is a way to make the web browser appear to process requests neutrally while still providing favorable treatment towards a particular browser.

BRIEF SUMMARY OF THE INVENTION

Embodiments of the present invention address deficiencies of the art in respect to processing requests from a client to a server and provide a novel and non-obvious method, system and computer program product for transmitting data in a surreptitious pattern. In an embodiment of the invention, a method for processing requests from a client system to a server system through a communications network can be provided. The method can include establishing a covert packetization pattern for fragmenting data into packets before transmission, splitting a request into one or more packets according to the covert packetization pattern, transmitting each packet to a server system, responsive to reconstructing fragmented packets, recognizing the covert packetization pattern, and responsive to recognizing the covert packetization pattern, giving priority to a client system.

In yet another embodiment of the invention, establishing a covert packetization pattern for fragmenting data into packets before transmission can further include hard coding both the server and client. Alternatively, establishing a covert packetization pattern for fragmenting data into packets before transmission can further include handshaking between the client and server.

In another embodiment of the invention, splitting a request into one or more packets according to the covert packetization pattern can further include randomly generating a packet splitting scheme. Alternatively, splitting a request into one or more packets according to the covert packetization pattern can further include rotating through one or more random packet splitting schemes that implicitly reveals the identity of the client to the server.

In yet another embodiment of the invention, a client request processing system can be provided. The system can include a client entity, a server, a covert packet generator logic coupled to the client entity having program code enabled to establish a covert packetization pattern for fragmenting data into packets before transmission, split a request into one or more packets according to the covert packetization pattern and transmit each packet to a server system through a data communications link, and also a covert packet recognizer logic coupled to the server having program code enabled to reconstruct fragmented packets, recognize the covert packetization pattern, and responsive to recognizing the covert packetization pattern, give priority to the client entity.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for transmitting packets in a surreptitious pattern. In accordance with an embodiment of the present invention, a web browser can be configured to fragment HTTP packets in an HTTP request into a surreptitious pattern before transmitting the request to a target server. The target server, in turn, can match the surreptitious pattern with a web browser type in order to identify the web browser. Thereafter, if the web browser is of a preferred type the HTTP request can receive differentiated treatment from the treatment afforded to other types of web browsers. Yet, the web browser can remain fully compliant as a standardized web browser in appearance.

Figure 1A:
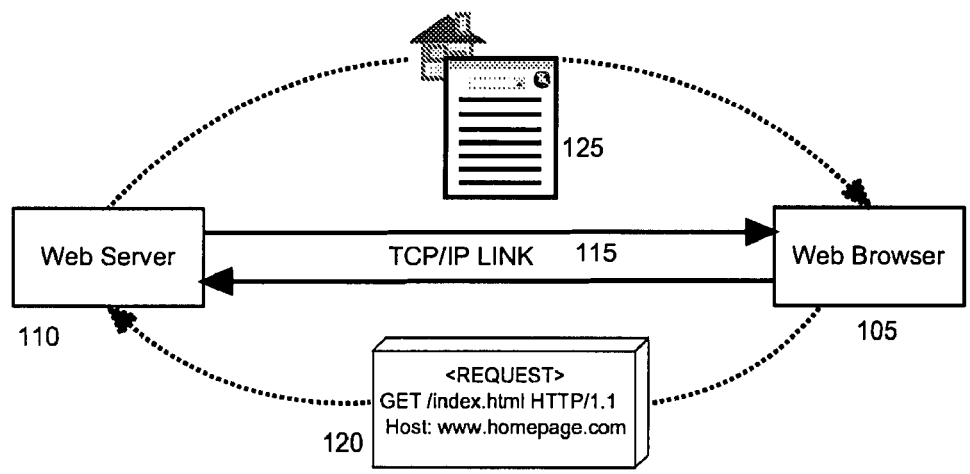
FIG. 1A is a schematic illustration of typical communication structure for a web browser and web server.
Figure 1B:
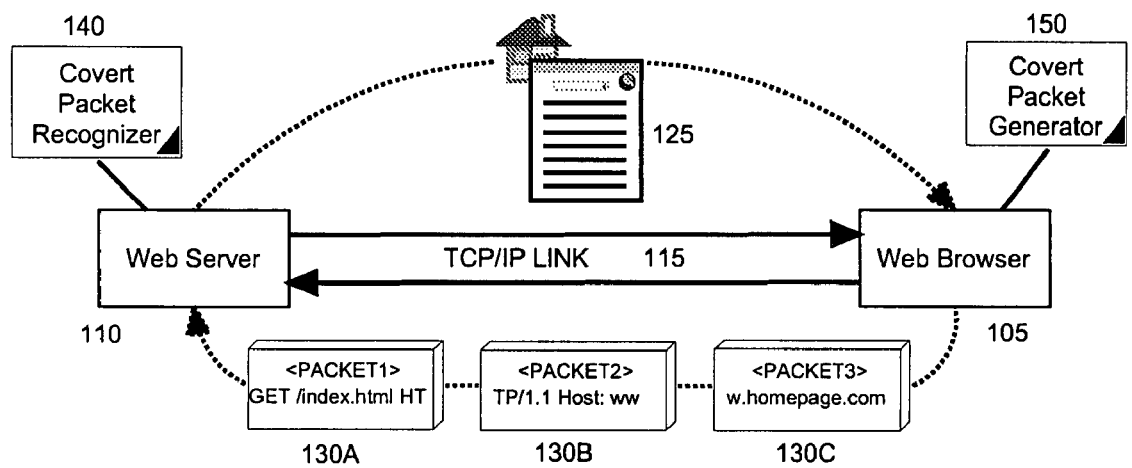
FIG. 1B is a schematic illustration of a surreptitious communications system for a web browser and web server.

In further illustration, FIG. 1B is a schematic illustration of a surreptitious communications system for a web browser and web server. The web server 110 can be coupled to covert packet recognizer logic 140 while a web browser 105 can be coupled to covert packet generator logic 150. The web server 110 can accept surreptitious HTTP requests 130A, 130B, 130C from the network, and provide an HTTP response 125 to the requesting web browser 105. The covert packet generator 150 can include program code enabled to direct the web browser 105 to packetize its HTTP requests in a surreptitious fashion, thus enabling the web server 110 to secretively prioritize the requests of well-favored browsers.

Figure 2A:
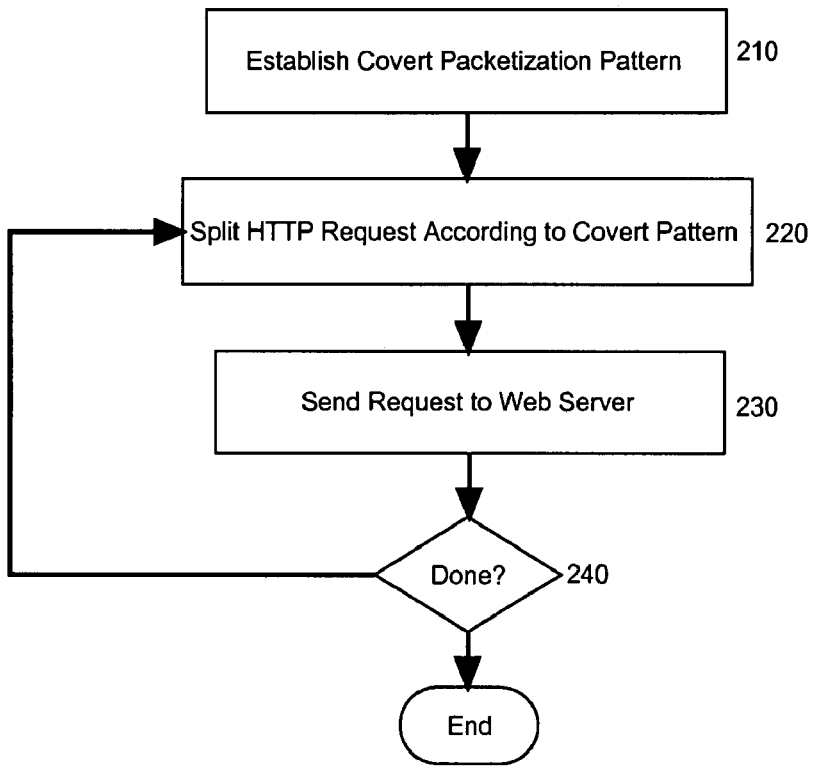
FIG. 2A is a flow chart illustrating a process for surreptitiously generating HTTP packets from a web browser to a web server.

Specifically, referring to FIG. 2A, a flow chart illustrating a process for surreptitiously generating HTTP packets from a web browser to a web server, in block 210 a requesting software entity such as a web browser can establish an agreement for a covert packetization pattern with the web server. This agreement between the server and the browser can be hard-coded, dynamically set, or alternatively done by handshaking. Once the covert packetization pattern is established, in block 220, the browser can split the HTTP request according to the established covert pattern. The covert splitting pattern of HTTP packets can be configured to rotate through predetermined or random patterns on the server or client-side. Next in block 230 the fragmented HTTP packets can now be sent to the web server by making a request to the web server, wherein the browser can identify itself implicitly by the covert splitting pattern recognized only by the designated web server who knows the secret scheme. In decision block 240, if there are more requests, then in block 220 the HTTP requests can be split according to the covert pattern that identifies which browser is communicating with the web server.

Figure 2B:
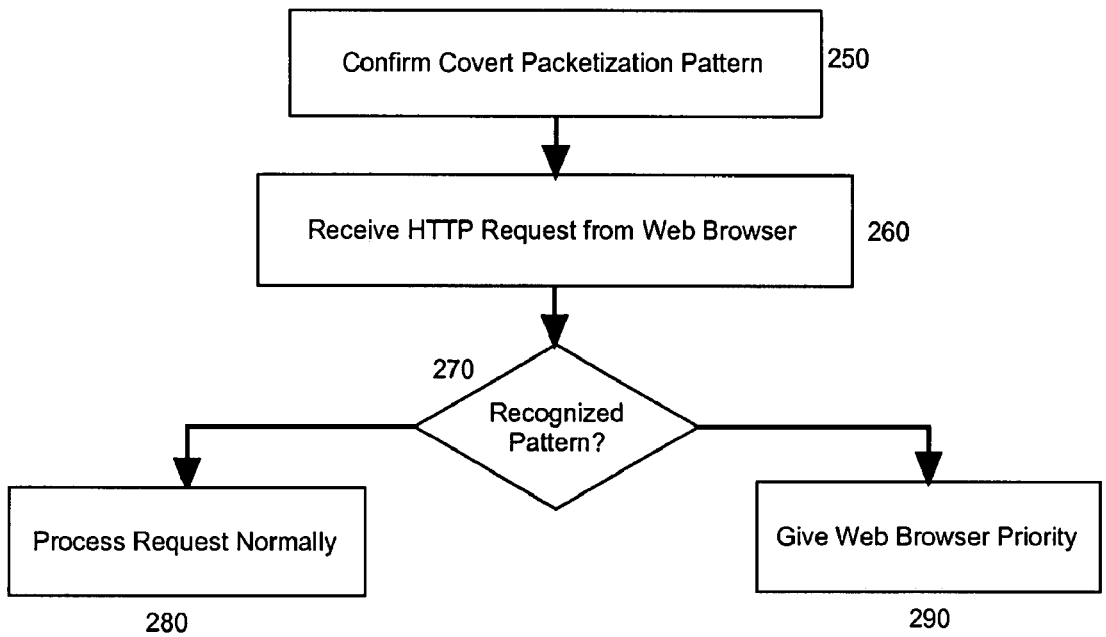
FIG. 2B is a flow chart illustrating a process for recognizing surreptitious HTTP packets received by a web server.

Continuing with the recognition of surreptitious HTTP packets in the server, FIG. 2B is a flow chart illustrating a process for recognizing surreptitious HTTP packets received by a web server. In block 250 the web server can confirm a prearranged covert packetization pattern or alternatively can establish the covert packetization pattern by handshaking with the web browser. Next in block 260 the web server can receive the HTTP requests from the web browser. In decision block 270 if the web server recognizes the covert pattern of fragmented packets and is able to identify whether that particular web browser is one of which the web server gives priority to, then in block 290 the web server can give that web browser priority for connection time or data access. If the server cannot recognize any covert scheme, then in block 280 it can process the request merely as a normal request without giving it any priority. In this way, only by analyzing the packetization of the data can an identifying method be found. Thus, the web browser can seem to be fully compliant yet still be given priority to perform hidden requests.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store, the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method of preferential treatment of a web browser on a client issuing a content request to a content server through a communications network, the method comprising:

establishing a covert packetization pattern for fragmenting portions splitting of the content request into packets according to a pre-determined pattern identifying a web browser type for the web browser before transmission of the content request;

receiving in a at the content server, comprising a memory and a processor, a set of packets split from a specific the content request according to the covert packetization pattern;

reconstructing the set of packets at the content server;

recognizing the covert packetization pattern from the reconstructed set of packets;

mapping the covert packetization pattern to the web browser type for the web browser; and, prioritizing processing of the specific content request for the web browser based on the web browser type.

2. The method of claim 1, wherein the step of establishing a covert packetization pattern for fragmenting portions of a content request according to a pre-determined pattern identifying a web browser type for the web browser before transmission of the content request further comprises hardcoding both the content server and the client.

3. The method of claim 1, wherein the step of establishing a covert packetization pattern for fragmenting portions of a content request according to a pre-determined pattern identifying a web browser type for the web browser before transmission of the content request further comprises handshaking between the client and the content server.

4. The method of claim 1, wherein the step of receiving in a content server comprising a memory and a processor of a computer, a set of packets split from a specific content request according to the covert packetization pattern further comprises randomly generating a packet splitting scheme.

5. The method of claim 1, wherein the step of receiving in a content server comprising a memory and a processor of a computer, a set of packets split from a specific content request according to the covert packetization pattern further comprises rotating through one or more random packet splitting schemes that implicitly reveals the identity of the client web browser to the content server.

6. A client request processing system comprising:
a client entity comprising a web browser;
a content server comprising a memory and a processor;
covert packet generator logic coupled to the client entity comprising program code enabled to establish a covert packetization pattern for fragmenting portions of splitting a content request into packets according to a pre-determined pattern identifying a web browser type for the web browser before transmission of the content request from the client entity to the content server, and transmit each the packets portion to the content server through a data communications link, and receive in the content server, a set of packets split from a specific content request according to the covert packetization pattern; and,
covert packet recognizer logic coupled to the server comprising program code enabled to receive a set of packets split from the content request according to the covert packetization pattern, reconstruct the set of packets, recognize the covert packetization pattern from the reconstructed set of packets, map the covert packetization pattern to the web browser type, and prioritize processing of the specific content request for the web browser based on the web browser type.

7. The system of claim 6, wherein the client entity is a software entity.

8. The system of claim 6, wherein the client entity is a web browser.

9. A computer program product comprising a non-transitory computer usable medium embodying computer usable program code for preferentially treating a web browser on a client issuing a content request to a content server, the computer program product comprising:
computer usable program code for establishing a covert packetization pattern for fragmenting portions of splitting the content request into packets according to a pre-determined pattern identifying a web browser type for the web browser before transmission of the content request;
computer usable program code for receiving in a at the content server comprising a memory and a processor, a set of packets split from a specific the content request according to the covert packetization pattern;
computer usable program code for reconstructing the set of packets at the content server;
computer usable program code for recognizing the covert packetization pattern from the reconstructed set of packets;
computer usable program code for mapping the covert packetization pattern to the web browser type; and
computer usable program code for prioritizing processing of the specific content request for the web browser based on the web browser type.

10. The computer program product of claim 9, wherein the computer usable program code for establishing the covert packetization pattern for fragmenting portions of a content request according to a pre-determined pattern identifying a web browser type for the web browser before transmission of the content request further comprises computer usable program code for handshaking between the client and the content server.

11. The computer program product of claim 9, wherein the computer usable program code for receiving the set of packets in a content server comprising a memory and a processor of a computer, a set of packets split from a specific content request according to the covert packetization pattern further comprises computer usable program code for randomly generating a packet splitting scheme.

12. The computer program product of claim 9, wherein the computer usable program code for receiving the set of packets in a content server comprising a memory and a processor of a computer, a set of packets split from a specific content request according to the covert packetization pattern further comprises computer usable program code for rotating through one or more random packet splitting schemes that implicitly reveals the identity of the client web browser to the content server.

* * * * *